Oct. 1, 1946.   C. BRONGERSMA   2,408,369
MOTOR CONTROL
Filed April 13, 1944
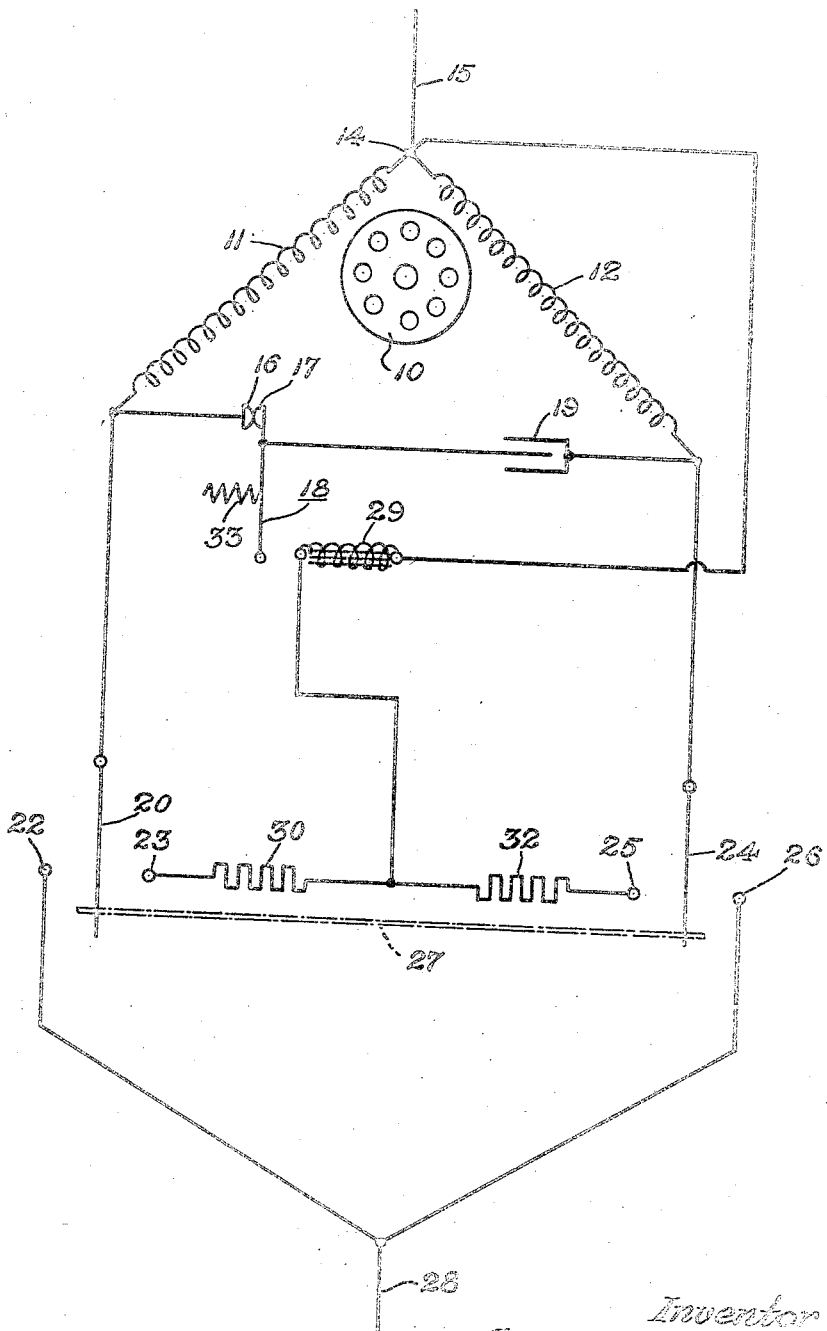
Inventor
Cornelius Brongersma
BY
Attorneys.

Patented Oct. 1, 1946

2,408,369

UNITED STATES PATENT OFFICE 2,408,369

MOTOR CONTROL

Cornelius Brongersma, Muskegon Heights, Mich., assignor to Manning, Maxwell & Moore, Inc., Muskegon, Mich., a corporation of New Jersey Application April 13, 1944, Serial No. 530,878

6 Claims. (Cl. 172—279)

This invention relates to an improved control arrangement which is particularly adaptable to single phase alternating current motors, and more particularly to such an arrangement which is characterized by simplicity and reliability of the necessary control apparatus, the provision for quick reversal of the motor and the establishment of a dynamic braking circuit for the motor.

The single phase alternating current motors of the type contemplated in conjunction with this invention are those of the class having starting and main or running windings between which there is space displacement and which establish fields displaced in space and phase. In the use of this class of motors, it is usual to have both windings energized from the power source during starting and to open the circuit from the power source to the starting winding after the motor has started and attained a predetermined speed. The opening of the starting winding circuit may be automatically effected mechanically by means such as a centrifugal switch, or electrically, as by an electromagnetic switch having normally closed contacts in series with the starting winding and an actuating winding connected across the starting winding. The latter or electrical type of control is preferred for use in conjunction with this invention.

Some motors of the class referred to have separate leads for separately making connections to each end of the main and starting field windings, while others have one end of one of the windings connected to an end of the other and a common lead for making one of the connections to both windings. The latter are commonly referred to in the art as "three lead" motors. When separate leads are provided for making connections to each end of each of the windings, reversal of the direction of rotation of the motor may be effected by reversal of the current flow through one of the windings with respect to that through the other of the windings. However, when the windings of the motor have a common connection, the reversal of the power source connections to one winding reverses the current flow through the other winding and the direction of rotation remains the same. With motors of the latter type which have a common connection between the windings, and particularly in view of the system of control which is comprehended by this invention, the windings should be adapted to interchangeable use as starting and main or running windings. Reversal of the use of the windings as starting and running windings effects reversal of the direction of rotation.

To provide quick and relatively sudden reversal of a motor of the type described, it is necessary quickly to reestablish the starting circuit for reverse rotation without allowing time for the rotor to decrease speed by an amount sufficient to effect decay of the induced voltage in the starting winding and the resultant closure of the contacts of the starting control switch. With the electrical type of control referred to, the reclosure of the contacts of the starting winding control switch is effected by interruption of the circuit to the actuating winding of the switch coincidentally with the operation of the reversing control. Also, by providing a circuit between the ends of motor field windings which are not normally connected, so that induced current flows through a closed circuit including the windings while and after the circuit from the power source is interrupted, a dynamic braking action results which diminishes the speed of the rotor.

An additional consideration is encountered in the contemplation of reversible motors which desirably have different operating characteristics, such as starting and operating torques, in the two directions of rotation. Such difference in the operating characteristics in the two directions of rotation is obtained in motors in which the windings are interchanged between the starting and running functions for effecting reversal by variation of the winding characteristics of the two field windings.

A general object of this invention is to provide an effective and relative simple system for effecting control and quick reversal of a single phase induction motor of the type having two field windings permanently connected together and only three external connecting leads.

It is also an object of this invention to provide a system of motor control for single phase induction motors which includes switching means for interchanging the starting and running winding functions of the two field windings to effect reversal of the motor operation and for coincidentally altering the connections of the motor starting control switch to effect control of the selected starting winding.

Another object of this invention is to provide a system of motor control for single phase alternating current motors in which windings having different characteristics are alternated between starting and running circuit operation to effect reversal of the direction of rotation and which utilizes a single control relay for controlling the motor starting circuit to either one of the windings which is serving as a starting winding for the selected direction of rotation.

Another object of this invention is to provide a system of motor control adaptable to single phase motors of the type having permanently connected field windings and a voltage responsive relay for controlling the starting winding circuit, and which system includes switch means for quickly effecting reversal of the direction of rotation of the motor and causes establishment of a dynamic braking circuit for damping motor rotor movement during the operation of the switch means.

Other objects and advantages of the invention will become apparent as the following description proceeds, taken in connection with the accompanying drawing in which the single figure of the drawing is a schematic circuit diagram which illustrates the preferred embodiment of this invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing, a single phase alternating current motor of the induction motor type has a rotor 10, which is preferably of the usual squirrel cage variety, and field windings 11 and 12 associated with the rotor. The field windings 11 and 12 are displaced in space and are adapted to create magnetic fields which are displaced in space and phase. In a reversible motor of the type herein considered, the field windings 11 and 12 may have similar characteristics when similar operating characteristics are desired for both directions of rotation. But, in other instances, such as where more torque is desired in the one direction of rotation than in the other, the windings 11 and 12 may differ. Both of the field windings are adapted for use either as a starting winding or as the main or running winding of the motor.

In the preferred embodiment which is disclosed, the field windings 11 and 12 are connected together permanently at a common terminal 14 to constitute a so-called "three lead" motor. One power supply line lead 15 connected to the common terminal 14 of the two field windings. The other end of the winding 11 is connected through contacts 16 and 17 of a starting circuit control relay 18 to one side of a reactor or condenser 19 as well as to a movable switch element 20 which is adapted alternately to make connections with contacts 22 and 23. The other end of the field winding 12 is connected to the other side of the reactor or condenser 19 and to a movable switch element 24 which is adapted alternately to make connections with contacts 25 and 26. The movable switch elements 20 and 24 are coincidentally operated by a common actuating member 27. A second power supply line lead 28 is connected to the contacts 22 and 26 so that that power supply line lead may be selectively and alternately connected directly to the field winding 11 by engagement of the movable switch element 20 with the contact 22 and to the field winding 12 by engagement of the movable switch element 24 with the contact 26. An actuating electromagnet 29 of the starting circuit control relay 18 has one end connected to the common terminal 14 of the field windings 11 and 12, and its other end connected to the contacts 23 and 25 through resistors 30 and 32 respectively. The contacts 16 and 17 of the starting circuit control relay 18 are preferably normally closed and are biased into engagement by means such as a spring 33. The contacts are adapted to be opened by the action of the electromagnetic actuating winding 29.

Operation of the movable switch elements 20 and 24 to one position by actuation of the common actuating member 27 connects the power supply line lead 28 to one end of the field winding 11 through the contact 22 and connects the actuating electromagnet 29 across the field winding 12 through the resistor 32 and contact 25. In this instance, the field winding 12 serves as a starting winding and the field winding 11 serves as a main or running winding. The starting circuit to the field winding 12 is established from the power supply line lead 28 through the normally closed contacts 16 and 17 of the starting circuit control relay and through the reactor or condenser 19. As is usual with motors of this type, the actuating electromagnet 29 effects opening of the contacts 16 and 17 when the motor rotor has attained a predetermined speed. In this instance, the actuating electromagnet 29 is responsive to the potential across the field winding 12, which potential increases as the rotor speed increases.

Even when the power supply circuit to the running winding 11 is opened, the induced potential in the starting winding decays quite slowly. Accordingly, if the relay winding 29 remains connected across such winding 12, the relay contacts 16 and 17 will not close promptly upon opening of the running winding power circuit. It is to overcome the difficulty which would result in connection with quick reversal due to the slow decay of starting winding potential that contact 25 is provided for opening the circuit to the relay winding 29 at the same time the contact 22 opens the power circuit to the running winding 11.

Actuation of the movable switch elements 20 and 24 to the "off" or neutral position intermediate their respective contacts while the motor is running opens the energizing circuit to the actuating electromagnet 29 and thereby effects closure of the contacts 16 and 17 to close a circuit between the unconnected ends of the field windings 11 and 12 through those contacts and the reactor or resistor 19. The field windings 11 and 12, being connected together at 14 and having a circuit formed between their other ends through the reactor or condenser 19 while the rotor is running, form a closed circuit for the circulation of currents induced by the rotor in the field windings and thus produce a dynamic braking action which tends to reduce the rotor speed. It is a feature of this circuit that the dynamic braking circuit is closed and established immediately upon opening of the power supply line circuit to stop the motor after its operation in either direction.

When the power supply line lead 28 is connected to the field winding 12 by engagement of the contact 26 with the movable switch element 24, that field winding 12 serves as a main or running winding of the motor while the field winding 11 serves as the starting winding. This reversal of the use of the windings reverses the direction of rotation of the rotor. When the field winding 12 serves as the main or running winding, the starting circuit to the field winding 11 is established from the power supply line lead 28 through the contact 26, reactor or condenser 19, and normally closed contacts 16 and 17. In this instance, the actuating electromagnet 29 is connected across the field winding 11, through the resistor 30 and the contact 23 which engages the movable switch element 20.

The resistors 30 and 32 may be used in the circuit, as illustrated, to limit the current flow through the actuating electromagnet 29 but their principal function is that of equalizing the operating current values in the actuating electromagnet 29 when the field windings 11 and 12 have dissimilar characteristics. That is, the resistor 32 limits the current flow through the actuating electromagnet 29 when the field winding 12 serves as a starting winding and the resistor 30 limits the current through the actuating electromagnet 29 when the field winding 11 serves as a starting winding. The values of the resistors 30 and 32 are predetermined and established in such a way that the current flow through the actuating electromagnet 29 reaches the predetermined value for effecting actuation of the relay 18 at a rotor speed value which accompanies the use of either of the dissimilar field windings 11 and 12 as starting windings. It is a feature of this preferred circuit that the operating current of the actuating electromagnet 29 may be predetermined by the resistors 30 and 32 to accomplish the desired operation of the starting circuit control relay 18 when either of the field windings is used as a starting winding and even when those field windings have different characteristics for producing dissimilar operating characteristics of the motor in the two directions of rotation.

It is also a feature of this preferred circuit that two factors contribute to quick reversal of the motor. In the first place, the quick shifting of the common actuating member 27 from one operating position to the other, to effect reversal of the motor, opens the circuit to the actuating magnet 29 in the intermediate position and thereby effects immediate closure of the starting circuit contacts 16 and 17 for establishment of the starting circuit for reverse operation. In the second place, this closure of these contacts 16 and 17 establishes a dynamic braking circuit through the field windings 11 and 12, the reactor or condenser 19, and the contacts 16 and 17. The resulting dynamic braking tends to reduce the rotor speed during the interim between the opening of the circuit for one direction of operation and the closing of the circuit which starts the motor in the reverse direction; the dynamic braking circuit being established whenever the movable switch elements 20 and 24 are actuated to the "off" position. The motor acts as a brake to effect quick stopping of the rotor, as well as to assist in reducing the rotor speed for aiding quick reversal of the motor.

I claim as my invention:

1. In a control for effecting quick reversal of a single phase alternating current motor including a rotor, a pair of displaced field windings connected together at one end and having different characteristics, the combination of a power supply line lead connected to the connected ends of the field windings, a starting circuit control relay having an electromagnetic actuating winding, a second power supply line lead, switching means for selectively alternating the connection of the other ends of the field windings to said second power supply line for effecting selective reversal of the rotor rotation, said switching means having contacts for coincidentally effecting selective alternations of the field winding to which said electromagnetic actuating winding is connected, and compensating means in the circuit of said electromagnetic actuating winding providing compensation for the difference of characteristics of said field windings.

2. In a control for effecting quick reversal of a single phase alternating current motor including a rotor, a pair of cooperating field windings, and a condenser adapted to be connected in series with one of the field windings during starting, the combination of a pair of power supply line leads through which operating current is supplied to the motor, switching means for selectively alternating the one of said field windings which receives power from the power supply line leads directly and the one which receives power from the supply line leads through said condenser to effect selective reversal of the rotor rotation, a voltage responsive relay having contacts connected in series with the condenser and a voltage responsive electromagnetic actuating winding for automatically controlling the starting and running of the motor in each direction and said switching means including coincidentally operated means for connecting said electromagnetic actuating winding across the one of said field windings which receives power through said condenser.

3. In a control for effecting quick reversal of a single phase alternating current motor including a rotor, a pair of cooperating field windings having different characteristics, and a condenser adapted to be connected in series with one of the field windings during starting, the combination of a pair of power supply line leads through which operating current is supplied to the motor, switching means for selectively alternating the one of said field windings which receives power from the power supply line leads directly and the one which receives power from the supply line leads through said condenser to effect selective reversal of the rotor rotation, a voltage responsive relay having contacts connected in series with the condenser and a voltage responsive electromagnetic actuating winding for automatically controlling the starting and running of the motor in each direction, said switching means including coincidentally operated means for connecting said electromagnetic actuating winding across the one of said field windings which receives power through said condenser, and compensating means adapted to equalize the voltage applied to said actuating winding from the field windings.

4. In a reversing control for a three lead, single phase, alternating current motor having a pair of field windings with one terminal of each connected to a common lead and the other terminals of said windings connected to separate ones of the other two leads, the combination of a starting relay having a voltage responsive actuating winding and a pair of normally closed contacts, a phase shifting device, means for connecting said phase shifting device across said other two leads in series with said contacts, and means including a reversing switch having an 'off' position and alternatively available "on" positions for connecting alternate ones of said other two leads and said common lead to a source of current in its "on" positions and simultaneously connecting said relay winding between the remaining one of said other pair of leads and said common lead and for open-circuiting said relay winding as well as both of said motor windings in its "off" position.

5. In a reversing control for a three lead, single phase, alternating current motor having a pair of field windings with one terminal of each connected to a common lead and the other two terminals of said winding connected to separate ones of the other two leads, the combination of a phase shifting device, a starting relay having a voltage responsive actuating winding and a pair of normally closed contacts, means connecting said phase shifting device across said other two leads in series with said contacts, means for connecting said common lead to one of a pair of single phase alternating current power lines, means including a reversing switch having an "off" position and alternatively available "on" positions for connecting alternate ones of said other two leads to the other of said pair of power lines in its "on" positions and simultaneously connecting said relay winding between the remaining one of said other pair of leads and said common lead and for open-circuiting said relay winding in its "off" position as well as for disconnecting both of said other two leads from said other power line, whereby closure of said contacts incident to shift of said reversing switch to its "off" position serves to connect both motor windings in series with each other and said phase shifting device for dynamic braking of the motor.

6. In a reversing control for a single phase, alternating current motor having a pair of field windings, the combination of a phase shifting device, means including a reversing switch for connecting alternative ones of said windings across a source of potential to operate as running windings for corresponding opposite directions of motor rotation and with the other winding of the pair in each instance connected across such source in circuit relation with said phase shifting device to operate as a dephased starting winding, means operable automatically upon attainment of a predetermined speed of the motor for disabling said phase shifting device, and means operable automatically upon actuation of said reversing switch from forward to reverse position therefor or vice versa for effecting restoration of said phase shifting device to the circuit.

CORNELIUS BRONGERSMA.